United States Patent [19]

Lewer

[11] 3,761,176

[45] Sept. 25, 1973

[54] AUTOMATIC EXPOSURE CONTROL FOR COPY MACHINE

[75] Inventor: Gregory S. Lewer, St. Paul, Minn.

[73] Assignee: Minnesota Mining and Manufacturing Company, St. Paul, Minn.

[22] Filed: July 27, 1971

[21] Appl. No.: 166,607

Related U.S. Application Data

[63] Continuation of Ser. No. 829,356, June 20, 1969, abandoned.

[52] U.S. Cl..................... 355/83, 355/115, 355/132
[51] Int. Cl. ............................................. G03b 27/78
[58] Field of Search....................... 355/68, 83, 115, 355/132

[56] References Cited
UNITED STATES PATENTS

| 2,501,365 | 3/1950 | Varden | 355/68 |
| 2,835,165 | 5/1958 | Smith, Jr. | 355/68 |
| 3,605,048 | 9/1971 | Sargent | 355/83 |

Primary Examiner—Samuel S. Matthews
Assistant Examiner—Richard A. Wintercorn
Attorney—Kinney, Alexander, Sell, Steldt and Delahunt

[57] ABSTRACT

An automatic exposure control apparatus and method for a reflex photocopier including a light source and a diffuse reflector for reflecting light from the source uniformly onto a light-transmissive photosensitive film in intimate contact with an original document. A sample of light representative of the sum of the intensity of the light from the source and the intensity of the light reflected from the original document back through the film is continuously collected during each exposure cycle and each exposure cycle is controlled to maintain the integral of the intensity of the sample of light as a function of time constant over successive exposure cycles. The apparatus and method produce proper differential desensitization of the photosensitive film according to the differential reflectivity of the original document copied.

8 Claims, 3 Drawing Figures

PATENTED SEP 25 1973  3,761,176

INVENTOR.
GREGORY S. LEWER
BY Kinney, Alexander,
Sell, Steldt & DeLaHunt
ATTORNEYS

AUTOMATIC EXPOSURE CONTROL FOR COPY MACHINE

REFERENCE TO RELATED APPLICATION

This is a continuation of U.S. application Ser. No. 829,356, filed on June 2, 1969 and now abandoned.

BACKGROUND OF THE INVENTION

Reflex photocopiers generally comprise a light source, an open diffuse reflector, a transparent plate covering the reflector opening, and means for positioning both an article to be copied and a photosensitive film. Light produced by the light source is diffused by the open reflector and caused to impinge upon the article to be copied. The article partially absorbs and partially reflects the light and the film is interposed in the optical path of light reflected by the article.

Such photocopiers desensitize or expose a light-transmissive sensitized film member in reflex position over a printed original. The film is then removed from the exposure area and placed against a coated receptor and the composite is heated. Film areas not desensitized by the exposure react with the receptor sheet coating to form a reproduction of the original image on the receptor sheet. Workman U.S. Pat. No. 3,094,417 describes such a method and suitable copy-sheet products for use therewith.

An apparatus typical of such a reflex photocopier is described in Appeldorn, et al, U.S. Pat. No. 3,234,868. In that patent, the open reflector generally has the shape of a truncated spheroid and has its interior surface painted or otherwise provided with a flat white surface to provide maximum diffuse reflection. A transparent plate, e.g. simply a glass plate, is positioned across the open end of the reflector to allow passage therethrough of diffuse light. The plate surface which faces inwardly of the open reflector is coated with a light transmitting, thin, uniform stratum of a binder containing a white pigment such as titanium dioxide. During an exposure cycle, the outwardly facing plate surface is positioned over a photosensitive film and original so that light passing through the plate will expose the photosensitive film.

In the reflex position the photosensitive film lies over the printed surface, i.e., between it and the light source. The light passes through the photosensitive film, being absorbed at the black or colored imaged areas and reflected at the less absorptive white background areas. Some of the energy is also absorbed within the photosensitive film, the action causing desensitization of the reactive coating. The degree of desensitization is proportional to the product of the desensitizing light intensity and the exposure time. The exposure is continued for a time just sufficient to completely desensitize the doubly exposed film above the background areas, the film over the imaged areas thus retaining a degree of sensitivity or reactivity. The exposure, therefore, must be carefully controlled if effective copying is to be accomplished. Generally, the light source output has been maintained essentially constant and attempts to control exposure have been by controlling the duration of the exposure cycle.

Proper control of the exposure time in reflex photocopiers has been a major problem. Originals having different aggregate reflective and absorptive properties require different exposure times. No adequate method or means for automatically controlling exposure time has heretofore existed.

A further problem is that the light source energy output is usually dependent upon the line voltage which powers the copier. Such line voltages frequently vary. Accordingly, if multiple copies were being run and the line voltage fluctuated during the run, imperfect copies would result even though the exposure time setting was initially correct.

SUMMARY OF THE INVENTION

The present invention overcomes the foregoing problems of existing reflex photocopiers by controlling each exposure cycle according to the light intensity within the copier diffuse reflector during the exposure cycle.

It has been found that during reflex exposure, light directed against and then reflected from an original document being copied is again reflected from the diffuse reflector onto the photosensitive film and that the intensity of this reflected light is sufficiently great to vary, according to the reflectivity of the original document, the time required to totally desensitize the photosensitive film over background areas of the original document. The present invention provides an apparatus and method for compensating for this variation.

According to the present invention a sample of light is collected which is representative of the sum of the intensity of the light from the source and the intensity of light reflected from the original document. The exposure cycle is controlled to maintain the integral of the intensity of the light sample as a function of exposure time constant over successive exposure cycles, which constant equals a predetermined value representing total desensitization of the areas of the photosensitive film over background areas of the original document.

In one aspect of the present invention the integral of the intensity of the light sample as a function of time is maintained constant by integrating the intensity and terminating the exposure cycle when the integral equals the predetermined constant value. The light integrating means may be the combination of a photoelectric device and a current integrator. The photoelectric device produces a current output, the amplitude of which is directly proportional to the intensity of the light impinging upon the device. The integrator, such as a resistor-capacitor (RC) charging circuit, produces a reference voltage having an amplitude proportional to the integral of the photoelectric device current. A voltage sensing circuit coupled to sense the amplitude of the reference signal produces a signal for terminating the exposure cycle when the reference signal reaches a predetermined level.

For a particular predetermined level and photoelectric device, the integration constant (e.g. the time constant of the resistor and capacitor of the RC charging circuit) is selected according to the minimum and maximum exposure times desired. The minimum exposure time corresponds to an original for which virtually the entire photosensitive film is to be desensitized. Conversely, the maximum exposure time corresponds to an original for which virtually none of the photosensitive film is to be desensitized. The resistor and capacitor values may be selected by first measuring the respective current outputs of the photoelectric device for these minima and maxima conditions. Then, for the desired film speed or desired range of film speeds and for the nominal illumination provided by the particular copier, an optimum integration constant could be chosen. In the case of an RC integrator, the time constant would be chosen such that the film for an all black original was not overly desensitized yet the film for a virtually all white original would be fully desensitized. Of course, if desired, different time constants may be provided for different ranges of film speeds. For example, a switch may be provided for inserting different values of either or both R and C into the circuit depending upon the film speed; or, current amplifiers of different gain may be selectively interposed between the photoelectric device and the RC charging network. Alternatively, the voltage sensing circuit may be selectively made to trigger for different voltages on the capacitor.

Ideally, the photoelectric device should be mounted so as to receive only diffuse light. If the device is mounted such that light may travel to it in a direct line from the lamp, diffuse light must also impinge upon it. Further, the exposure time computation must then be made independently of the "direct-line" component of light. And, in such direct-line applications, the photoelectric device must be sensitive enough to respond to diffuse light variations (the diffuse light component may be small compared to the direct light component). Also, if variations in the nominal illumination such as those caused by line voltage fluctuations are to be compensated for, the device must distinguish between a direct light and diffuse light variation and make an additional computation for a direct light variation.

DESCRIPTION OF THE PREFERRED EMBODIMENTS

Figure 1:
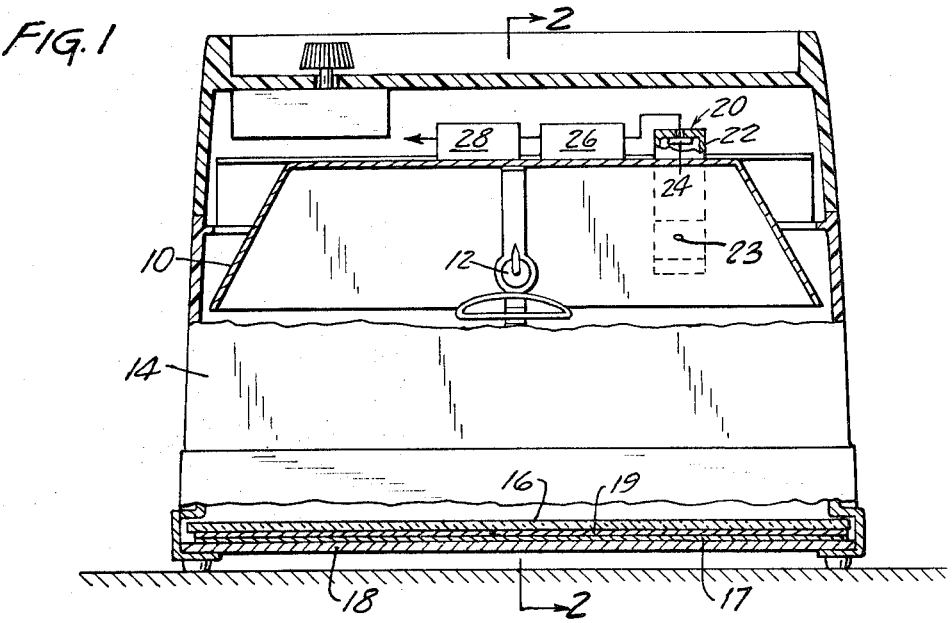
FIG. 1 is a combinational partially cut-away front elevation of a photosensitive copier exposure unit to which is attached a preferred embodiment of an automatic exposure control apparatus of the present invention and a diagrammatic wiring diagram of the exposure control circuitry.
Figure 2:
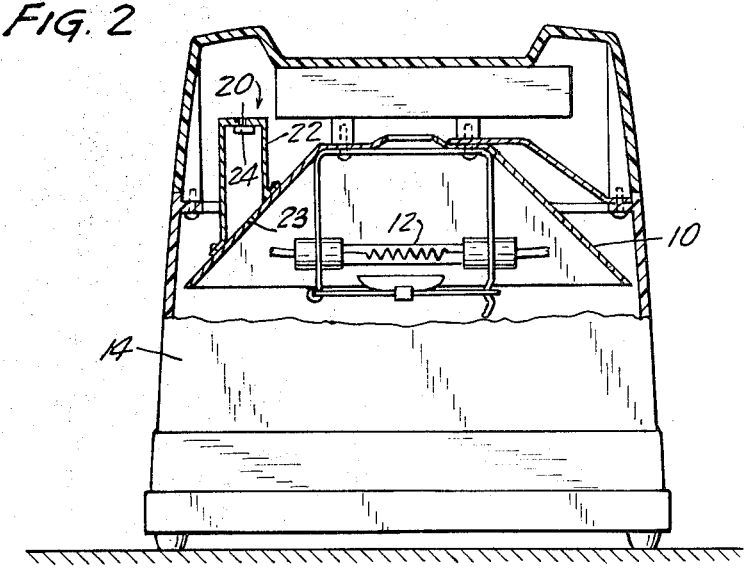
FIG. 2 is an end elevation similar to FIG. 1.

The exposure unit is shown to comprise an open reflector 10, a lamp 12 within the reflector, a casing 14, a beam splitter plate 16, a pressure pad 18 and an automatic exposure control unit 20. The plate 16 and pad 18 are shown sandwiching an original 17 and sheet of sensitized film 19 as they would during an exposure cycle. The reflector, lamp, casing, beam splitter plate, and pressure pad components are old and are described in detail in the Appeldorn patent.

What is new is the automatic exposure control unit 20 which is shown to comprise a sensor chamber 22, photoelectric device 24, integrating circuit 26, and voltage sensing circuit 28. Sensor chamber 22 has an end surface and a tubular portion extending from the end surface and joined at its other end to a side portion of the reflector. Preferably, the interior surface of the sensor chamber is coated with a flat white paint similar to that provided on the reflector interior surface. An aperture 23 in said side portion allows passage of light from the reflector into the sensor chamber wherein a sample of the light impinges upon the photoelectric device 24, shown mounted to the end surface of chamber 22.

Photoelectric device 24 is shown mounted within the sensor chamber in non-alignment with the lamp source and the aperture 23. "Direct-line" light does pass through the aperture into the sensor chamber but does not directly impinge upon the photoelectric device. The light sample impinging upon the photoelectric device thus includes a component of direct-line light; however, it has been found that even when the aperture 23 is placed in a position believed to allow passage therethrough of the greatest component of direct-line light, i.e., on one of the reflector end portions midway between the edges and at about the same vertical height as the lamp, the photoelectric device still provides a reliable indication of the intensity of the ambient diffuse light within the reflector. The output of the photoelectirc device is coupled to an integrating circuit whose output is coupled to a voltage sensing circuit the output of which may be employed to terminate the exposure cycle.

Figure 3:
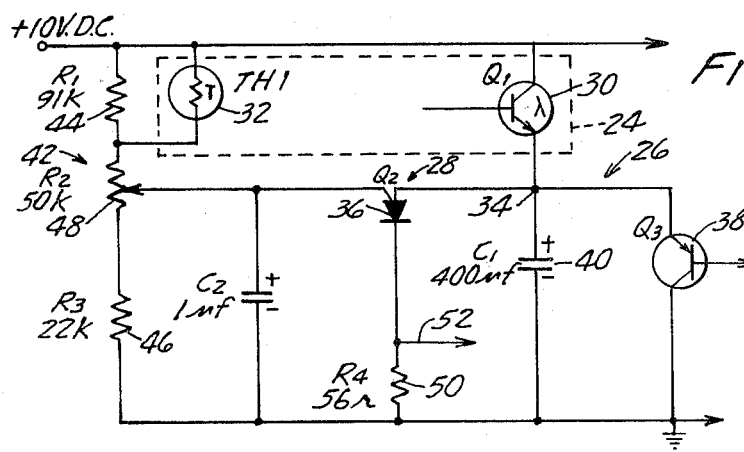
FIG. 3 is a circuit schematic of the preferred embodiment of the diagrammatic wiring diagram of FIG. 1.

FIG. 3 is a schematic circuit diagram of preferred embodiments of photoelectric device 24, integrating circuit 26, and voltage sensing circuit 28. Photoelectric device 24 is shown to comprise a phototransistor 30 and, optionally, a thermistor 32. The output of the photoelectric device is connected to a node 34 which is common to the anode lead of a programmable unijunction transistor (PUT) 36, the emitter lead of a transistor 38, and the lead of one plate of a capacitor 40. The lead connected to the other plate of capacitor 40 is tied to ground and the gate lead of PUT 36 is maintained at a positive bias potential by voltage divider network 42 comprised of resistors 44 and 46 and variable resistor 48. An output resistor 50 is coupled between ground and the PUT 36 cathode and an output lead 52 is provided at a node common to the output resistor and PUT 36 cathode.

Normally, between exposure cycles, transistor 38 is conducting and capacitor 40 is discharged. Upon initiation of an exposure cycle, transistor 38 is reverse biased substantially simultaneous with energization of the exposure lamp. During exposure cycle, light from the open reflector passes through the aperture and is collected by phototransistor 30. The emitter current output of phototransistor 30 is in series with capacitor 40 to form the RC time constant or "integration constant" of the integrator. Phototransistor 30 provides a current output whose amplitude is directly proportional to the intensity of the sample of light. Current flowing from phototransistor 30 then begins charging capacitor 40. When the charge on capacitor 40 reaches a predetermined level, the anode of PUT 36 is more positive then the PUT 36 gate, biasing PUT 36 into the avalanche mode. The charge on capacitor 40 then discharges through PUT 36 and across output resistor 50 to produce an output signal on lead 52 which is then employed to terminate the exposure cycle.

Variable resistor 48 permits selective adjustment of the PUT 36 gage bias voltage and provides a convenient method of adjusting the automatic exposure control circuit for use with different film speeds. By providing the means for varying the resistance with a pointer and by providing a dial associated with the pointer and indicating thereon the proper pointer position for each desired film speed, an operator may conveniently set the pointer for the particular film speed being used. In a similar manner, variable resistor 48 may be employed to control the degree to which the film background areas are desensitized should one desire a background other than a fully exposed, white background. An alternative method of adjusting for film speeds or controlling the background area desensitization would be adjustment of a mechanical shutter to control the size of the aperture opening to, in effect, vary the integrator time constant.

I claim:

1. In a photocopier including a light source and a diffuse reflector for reflecting light during an exposure cycle from the source uniformly onto a light-transmissive photosensitive film in intimate contact with an original document having image and nonimage areas providing a differential reflectivity to differentially desensitize the photosensitive film according to the differential reflectivity of the original document, an automatic exposure control comprising:

means for collecting continuously during the exposure cycle a sample of light representative of the sum of the intensity of the light from the source and the intensity of the light reflected from the original document, and means response to said means for collecting for controlling the exposure cycle to maintain the integral of the intensity of said sample of light as a function of time constant over successive exposure cycles.

2. In a photocopier including a light source and a diffuse reflector for reflecting light during an exposure cycle from the source uniformly onto a light-transmissive photosensitive film in contact with an original document having image and nonimage areas providing a differential reflectivity to differentially desensitize the photosensitive film according to the differential reflectivity of the original document, an automatic exposure control comprising:

means for collecting continuously during the exposure cycle a sample of light representative of the sum of the intensity of the light from the source and the intensity of the light reflected from the original document, means for integrating the intensity of said sample of light as a function of time, and means responsive to said means for integrating for controlling the exposure cycle to discontinue desensitization of the photosensitive film when the integral of the intensity of said sample of light as a function of time equals a predetermined value.

3. A photocopier as defined in claim 2 wherein said collecting means comprises:

a sensor chamber having an end surface and a tubular member extending from the end surface to an aperture in a portion of said reflector permitting passage of light from said reflector into said sensor chamber; and a photoelectric device positioned within said sensor chamber for producing an output signal the amplitude of which is directly proportional to the intensity of said sample of light.

4. A photocopier as defined in claim 3 wherein said integrating means and said controlling means comprise:

integrating circuit means for providing an integration signal having an amplitude proportional to the integral of said photoelectric device output signal; and voltage sensing circuit means for providing a control signal in response to said integration signal reaching a predetermined level.

5. A photocopier as defined in claim 4 wherein:

said photoelectric device is a phototransistor positioned within said sensor chamber in non-alignment with said light source and said aperture;

said integrating circuit means comprises a capacitor and switch means, said switch means being adapted to enable a charge buildup on one plate of said capacitor only during exposure intervals to provide said integration signal at said one plate of said capacitor; and said voltage sensing circuit means is a programmable unijunction transistor having its anode lead connected to said one plate of said capacitor, having its gate lead connected to a source of positive potential of a predetermined reference level and having its cathode lead connected to an output resistor, said programmable unijunction transistor discharging said capacitor through said output resistor to produce said control signal when the charge buildup on said one plate of said capacitor causes said integration signal to exceed said predetermined reference level.

6. A photocopier as defined in claim 5 further comprising:

means for varying said predetermined reference level of said source of positive potential to permit selection of said reference level according to the film speed of said photosensitive film.

7. A method for controlling the exposure cycle time in a photocopier having a light source and a diffuse reflector for reflecting light during an exposure cycle from the source uniformly onto a light-transmissive photosensitive film in intimate contact with an original document having image and nonimage areas providing a differential reflectivity to differentially desensitize the photosensitize film according to the differential reflectivity of the original document, said method comprising the steps of:

initiating the exposure cycle;

collecting continuously during the exposure cycle a sample of light representative of the sum of the intensity of the light from the source and the intensity of the light reflected from the original document; and controlling the exposure cycle to maintain the integral of the intensity of said sample of light as a function of time constant over successive exposure cycles.

8. A method for controlling the exposure cycle time in a photocopier having a light source and an open reflector for reflecting light during an exposure cycle from the source uniformly onto a light-transmissive photosensitive film in intimate contact with an original document having image and nonimage areas providing a differential reflectivity to differentially desensitize the photosensitive film according to the differential reflectivity of the original document, said method comprising the steps of:

initiating the exposure cycle;

collecting continuously during the exposure cycle a sample of light representative of the sum of the intensity of the light from the source and the intensity of the light reflected from the original document;

integrating the intensity of said sample of light as a function of time; and interrupting reflection of light onto the photosensitive film to terminate the exposure cycle when the integral of the intensity of said sample of light as a function of time equals a predetermined value.

* * * * *